(12) United States Patent
Yoo et al.

(10) Patent No.: US 9,947,922 B2
(45) Date of Patent: Apr. 17, 2018

(54) POROUS SILICON-BASED PARTICLES, METHOD OF PREPARING THE SAME, AND LITHIUM SECONDARY BATTERY INCLUDING THE POROUS SILICON-BASED PARTICLES

(71) Applicants: LG Chem, Ltd., Seoul (KR); SJ Materials Co., Ltd., Ulsan (KR)

(72) Inventors: Jung Woo Yoo, Daejeon (KR); Mi Rim Lee, Daejeon (KR); Yong Ju Lee, Daejeon (KR); Eun Kyung Kim, Daejeon (KR); Han Ho Lee, Seoul (KR); Ji Hyun Yoon, Ulsan (KR); Byoung Man Bang, Gyeongsangbuk-do (KR); Chang Rae Lee, Ulsan (KR); Il Kyo Jeong, Ulsan (KR); Mi Kyeong Lee, Gyeongsangbuk-do (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/541,856

(22) Filed: Nov. 14, 2014

(65) Prior Publication Data

US 2015/0072240 A1     Mar. 12, 2015

Related U.S. Application Data

(63) Continuation of application No. PCT/KR2014/008093, filed on Aug. 29, 2014.

(30) Foreign Application Priority Data

Sep. 2, 2013 (KR) ........................ 10-2013-0104877
Aug. 27, 2014 (KR) ........................ 10-2014-0112617

(51) Int. Cl.
*H01M 4/38*     (2006.01)
*H01M 4/62*     (2006.01)
(Continued)

(52) U.S. Cl.
CPC ............ *H01M 4/386* (2013.01); *C01B 33/02* (2013.01); *C01B 33/037* (2013.01);
(Continued)

(58) Field of Classification Search
None
See application file for complete search history.

(56) References Cited

U.S. PATENT DOCUMENTS

2004/0166319 A1    8/2004   Li et al.
2006/0251562 A1    11/2006   Farrell et al.
(Continued)

FOREIGN PATENT DOCUMENTS

CN     102330142 A    1/2012
CN     103118976 A    5/2013
(Continued)

OTHER PUBLICATIONS

Megouda et al. "Au-assisted electroless etching of silicon in aqueous HF/H2O2 solution", Applied Surface Science 255, Available online Feb. 3, 2009, pp. 6210-6216.*
(Continued)

*Primary Examiner* — Gregg Cantelmo
(74) *Attorney, Agent, or Firm* — Lerner, David, Littenberg, Krumholz & Mentlik, LLP

(57) ABSTRACT

Provided are a porous silicon-based particle including a silicon (Si) or $SiO_x(0<x<2)$ particle, wherein the particle includes a plurality of nonlinear pores, and the nonlinear pores are formed as open pores in a surface of the particle, and a method of preparing the porous silicon-based particles. Porous silicon-based particles according to an embodiment of the present invention may be more easily dispersed in an anode active material slurry, may minimize side reactions with an electrolyte, and may reduce volume expansion during charge and discharge. Also, according to
(Continued)

an embodiment of the present invention, the shape, form, and size of pores formed in the porous silicon-based particle may be controlled by adjusting the type of a metal catalyst, the concentration of the catalyst, and etching time.

31 Claims, 5 Drawing Sheets

(51) Int. Cl.
*H01M 4/134* (2010.01)
*H01M 4/36* (2006.01)
*H01M 10/052* (2010.01)
*C01B 33/02* (2006.01)
*C01B 33/037* (2006.01)

(52) U.S. Cl.
CPC ......... *H01M 4/625* (2013.01); *H01M 10/052* (2013.01); *H01M 4/134* (2013.01); *H01M 4/366* (2013.01); *Y02T 10/7011* (2013.01)

(56) References Cited

U.S. PATENT DOCUMENTS

| | | | |
|---|---|---|---|
| 2009/0029256 A1* | 1/2009 | Mah | H01B 1/24 |
| | | | 429/231.8 |
| 2010/0301276 A1 | 12/2010 | Lee et al. | |
| 2011/0111294 A1 | 5/2011 | Lopez et al. | |
| 2013/0034714 A1 | 2/2013 | Canham et al. | |
| 2013/0122717 A1 | 5/2013 | Green et al. | |
| 2013/0196158 A1 | 8/2013 | Yoshida et al. | |

FOREIGN PATENT DOCUMENTS

| | | |
|---|---|---|
| JP | H0689891 A | 3/1994 |
| JP | 2012082126 A | 4/2012 |
| JP | 2012084521 A | 4/2012 |
| JP | 2013514252 A | 4/2013 |
| JP | 2013523588 A | 6/2013 |
| KR | 2008-0096106 A | 10/2008 |
| KR | 2010-0127990 A | 12/2010 |
| KR | 20120109080 A | 10/2012 |
| TW | 201133983 A | 10/2011 |

OTHER PUBLICATIONS

Chartier et al. "Metal-assisted chemical etching of silicon in HF-H2O2", Electrochimica Acta 53, Available online Mar. 13, 2008, pp. 5509-5516.*

International Search Report from PCT/KR2014/008093, dated Dec. 12, 2014.

Supplemental Search Report from European Application No. 14 81 4680, dated Sep. 11, 2015.

Byoung Man Bang, et al. "Scalable approach to multi-dimensional bulk Si anodes via metal-assisted chemical etching." Energy & Environmental Science, vol. 4, No. 12, Dec. 31, 2011, pp. 5013-5019.

T. Hadjersi, et al., "Metal-assisted chemical etching in HF/Na2S2O8 or HR/KMnO4 produces porous silicon." Thin Solid Films, Elsevier-Sequoia S.A. Lausanne, CH, vol. 459, No. 1-2, Jul. 31, 2004, pp. 271-275.

Chia-Yun Chen, et al., "Morphological Control of Single-Crystalline Silicon Nanowire Arrays near Room Temperature." Advanced Materials, vol. 20, No. 20, Oct. 17, 2008, pp. 3811-3815.

Kuiqing Peng, et al., "Fabrication of Single-Crystalline Silicon Nanowires by Scratching a Silicon Surface with Catalytic Metal Particles." Advanced Functional Materials, Wiley-VCH Verlag CmbH & Co. KGaA, Weinheim, vol. 16, No. 3, Feb. 3, 2006, pp. 387-394.

Office Action from Taiwanese Application No. 103130105, dated Feb. 2, 2016.

Lee, Jung-Pi, et al., "Extremely Superhydrophobic Surfaces with Micro- and Nanostructures Fabricated by Copper Catalytic Etching." Dec. 16, 2015, Langmuir, vol. 27, Issue 2, pp. 809-814.

Office Action from Chinese Application No. 201480005252.1, dated Jul. 7, 2016.

* cited by examiner

US 9,947,922 B2

POROUS SILICON-BASED PARTICLES, METHOD OF PREPARING THE SAME, AND LITHIUM SECONDARY BATTERY INCLUDING THE POROUS SILICON-BASED PARTICLES

CROSS-REFERENCE TO RELATED APPLICATIONS

The present application is a continuation of International Application No. PCT/KR2014/008093 filed Aug. 29, 2014, which claims priority from Korean Application Nos. 10-2014-0112617 filed Aug. 27, 2014, and 10-2013-0104877 filed Sep. 2, 2013, the disclosures of which are hereby incorporated herein by reference.

TECHNICAL FIELD

The present invention relates to porous silicon-based particles, a method of preparing the same, and a lithium secondary battery including the porous silicon-based particles.

BACKGROUND ART

Recently, in line with miniaturization, lightweight, thin profile, and portable trends in electronic devices according to the development of information and telecommunications industry, the need for high energy density batteries used as power sources of such electronic devices has increased. Currently, research into lithium secondary batteries, as batteries that may best satisfy the above need, has actively conducted.

Various types of carbon-based materials including artificial graphite, natural graphite, or hard carbon, which are capable of intercalating/deintercalating lithium, have been used as anode active materials of lithium secondary batteries. Among the carbon-based materials, since graphite provides advantages in terms of energy density of a lithium battery and also guarantees long lifespan of the lithium secondary battery due to excellent reversibility, graphite has been most widely used.

However, since graphite may have a low capacity in terms of energy density per unit volume of an electrode and may facilitate side reactions with an organic electrolyte at a high discharge voltage, there is a risk of fire or explosion due to malfunction and overcharge of the battery.

Thus, metal-based anode active materials, such as silicon (Si), have been studied. It is known that a Si metal-based anode active material exhibits a high lithium capacity of about 4,200 mAh/g. However, the Si metal-based anode active material may cause a volumetric change of a maximum of 300% or more before and after the reaction with lithium, i.e., during charge and discharge. As a result, conductive networks in the electrode are damaged and contact resistance between particles is increased. Thus, there is a phenomenon in which a battery performance degrades.

Thus, a method of reducing substantial variations in diameter according to the volumetric change by reducing the size of silicon particles to a nano size has been attempted. However, there are difficulties in developing a method of synthesizing a uniform nano-silicon anode active material and uniformly distributing the nano-silicon anode active material in a slurry, and side reactions with an electrolyte may increase because a surface area is maximized.

Therefore, there is a need to develop an anode active material which may replace a typical anode active material and may address limitations in the side reactions with an electrolyte, volume expansion during charge and discharge, and performance degradation of a secondary battery.

PRIOR ART DOCUMENTS

Patent Document

Korean Patent Application Laid-Open Publication No. 2012-0109080

DISCLOSURE OF THE INVENTION

Technical Problem

The present invention provides porous silicon-based particles which may be more easily dispersed in an anode active material slurry, may minimize side reactions with an electrolyte, and may reduce volume expansion during charge and discharge.

The present invention also provides a method of preparing the porous silicon-based particles.

The present invention also provides an anode active material including the porous silicon-based particles.

The present invention also provides an anode and a lithium secondary battery including the anode active material.

Technical Solution

According to an aspect of the present invention, there is provided a porous silicon-based particle including a silicon (Si) or $SiO_x$ (0<x<2) particle, wherein the particle includes a plurality of nonlinear pores, and the nonlinear pores are formed as open pores in a surface of the particle.

According to another aspect of the present invention, there is provided a porous silicon-based particle including: a core part including silicon (Si) or $SiO_x$ (0<x<2); and a Si or $SiO_x$ shell part including a plurality of nonlinear pores on the core part, wherein a surface of the shell part has open pores.

According to another aspect of the present invention, there is provided a method of preparing the porous silicon-based particles including the steps of: (i) removing an oxide layer present on surfaces of silicon (Si) or $SiO_x$ (0<x<2) particles using an etching solution; and (ii) forming nonlinear pores in the Si or $SiO_x$ (0<x<2) particles by etching the Si or $SiO_x$ (0<x<2) particles by mixing and stirring the etching solution including the Si or $SiO_x$ (0<x<2) particles with a metal catalyst.

According to another aspect of the present invention, there is provided an anode active material including the porous silicon-based particles.

According to another aspect of the present invention, there is provided an anode including the anode active material.

According to another aspect of the present invention, there is provided a lithium secondary battery including the anode.

Advantageous Effects

Porous silicon-based particles according to an embodiment of the present invention may be more easily dispersed in an anode active material slurry, may minimize side reactions with an electrolyte, and may reduce volume expansion during charge and discharge by including silicon (Si) or $SiO_x$ (0<x<2) particles having a plurality of nonlinear pores.

Also, according to an embodiment of the present invention, the shape, form, and size of pores formed in the porous silicon-based particle may be controlled by adjusting the type of a metal catalyst, the concentration of the catalyst, and etching time.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A porous silicon-based particle according to an embodiment of the present invention include a silicon (Si) or $SiO_x$ (0<x<2) particle, wherein the particle includes a plurality of nonlinear pores, and the nonlinear pores are formed as open pores in a surface of the particle.

According to an embodiment of the present invention, the porous silicon-based particle may be more easily dispersed in an anode active material slurry, may minimize side reactions with an electrolyte, and may reduce volume expansion during charge and discharge by including the silicon (Si) or $SiO_x$ (0<x<2) particle having a plurality of nonlinear pores.

Figure 1:
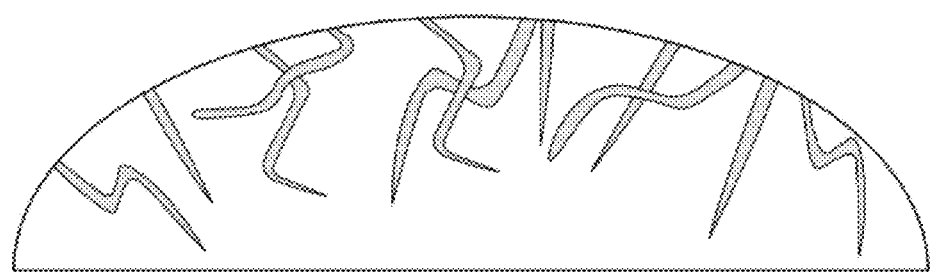
FIG. 1 is a schematic view illustrating a porous silicon-based particle including nonlinear pores according to an embodiment of the present invention.

Also, since the porous silicon-based particle according to the embodiment of the present invention includes nonlinear pores as illustrated in FIG. 1 and the nonlinear pores include open pores in the surface of the particle, the porous silicon-based particle may suppress the volume expansion of an anode active material during charge and/or discharge due to the presence of the open pores in the surface of the particle when used in a lithium secondary battery and may increase a contact area with an electrolyte due to an increase in the specific surface area of the anode active material. Thus, life characteristics and rate characteristics of the lithium secondary battery including the above anode active material may be improved.

In this case, an average diameter of the open pores is in a range of about 30 nm to about 500 nm, and may be in a range of 30 nm to 300 nm, when observed on the surface of the particle.

According to an embodiment of the present invention, the nonlinear pores, for example, may have a nonlinear, corn type structure in which a diameter of the nonlinear pore may gradually decrease in a direction of the center of the porous silicon-based particle.

Also, according to an embodiment of the present invention, at least two or more of the nonlinear pores may be connected to each other.

A depth of the nonlinear pore may be in a range of 0.1 μm to 5 μm. In this case, the depth of the nonlinear pore denotes a length from the open pore formed at the surface of the porous silicon-based particle to an end of the pore in which the diameter thereof gradually decreases in the direction of the center of the particle, and the depth of the nonlinear pore, for example, may be measured using scanning electron microscope (SEM) images or a mercury porosimeter.

Also, according to an embodiment of the present invention, a rate of change in volume of mercury intruded into the pore, which is measured by mercury porosimetry of the porous silicon-based particles, may have a peak in an average pore diameter range of 30 nm to 2,500 nm, for example, 50 nm to 600 nm. A total mercury intrusion volume at the peak may be in a range of 0.5 mL/g to 1.2 mL/g.

The expression "total mercury intrusion volume" denotes a volume of mercury intruded into a plurality of pores which is measured using a mercury porosimeter, and the total mercury intrusion volume is a value measured when the relationship between an average diameter of the pores and pressure is approximated by the equation: 180/pressure=average diameter of the pores, where the surface tension and contact angle of mercury are 485 mN/m and 130°, respectively.

Also, that the rate of change in intrusion volume of mercury may have a peak in an average pore diameter range of 30 nm to 2,500 nm from the results of mercury porosimetry measurements denotes that the rate of change in intrusion volume of mercury is distributed so as to have an upward convex curve having a peak in the above average pore diameter range from the results of mercury porosimetry measurements.

An average particle diameter ($D_{50}$) of the porous silicon-based particles according to the embodiment of the present invention is in a range of 1 μm to 20 μm, may be in a range of 3 μm to 12 μm, and for example, may be in a range of 5 μm to 10 μm.

In the case that the average particle diameter of the porous silicon-based particles is less than 1 μm, the porous silicon-based particles may be difficult to be dispersed in the anode active material slurry. In the case in which the average particle diameter of the porous silicon-based particles is greater than 20 μm, since the expansion of the particles due to the charge of lithium ions may become severe, adhesion between particles and adhesion between particles and current collector may decrease as the charge and discharge are repeated. Thus, cycle characteristics may significantly degrade.

In the present invention, the average particle diameter of the particles may be defined as a particle diameter at 50% in a cumulative particle diameter distribution. For example, the average particle diameter ($D_{50}$) of the particles according to the embodiment of the present invention may be measured by using a laser diffraction method. The laser diffraction method may generally measure a particle diameter ranging from a submicron level to a few mm, and may obtain highly repeatable and high resolution results.

A specific surface area (BET-SSA) of the porous silicon-based particles according to the embodiment of the present invention may be in a range of 5 $m^2/g$ to 50 $m^2/g$, and in the case that a lithium secondary battery is prepared by using the porous silicon-based particles satisfying the above range of the specific surface area as an anode active material, the rate characteristics of the lithium secondary battery may be improved.

In the case that the specific surface area is greater than 50 $m^2/g$, the side reactions with the electrolyte may be difficult to be controlled due to the large specific surface area. In the case in which the specific surface area is less than 5 $m^2/g$, since pores may not be sufficiently formed, the volume expansion during the charge and discharge with lithium may not be effectively accommodated.

According to an embodiment of the present invention, the specific surface area of the porous silicon-based particles may be measured by a Brunauer-Emmett-Teller (BET) method. For example, the specific surface area may be measured by a 6-point BET method according to a nitrogen gas adsorption-flow method using a porosimetry analyzer (Belsorp-II mini by Bell Japan Inc.).

According to another embodiment of the present invention, provided is a porous silicon-based particle including: a core part including Si or $SiO_x$ (0<x<2); and a Si or $SiO_x$ shell part including a plurality of nonlinear pores on the core part, wherein a surface of the shell part has open pores.

In the porous silicon-based particle, a ratio of a length of the core part to a length of the shell part may be in a range of 1:9 to 9:1.

The shape of the nonlinear pores and open pores according to the embodiment of the present invention and the average diameter of the pores are the same as described above, the shape and average diameter, for example, may be controlled by adjusting the type of a metal catalyst, the concentration of the catalyst, and etching time during the preparation of the porous silicon-based particles.

A method of preparing porous silicon-based particles according to an embodiment of the present invention may include the steps of: (i) removing an oxide layer present on surfaces of Si or $SiO_x$ (0<x<2) particles using an etching solution; and (ii) forming nonlinear pores in the Si or $SiO_x$ (0<x<2) particles by etching the Si or $SiO_x$ (0<x<2) particles by mixing and stirring the etching solution including the Si or $SiO_x$ (0<x<2) particles with a metal catalyst.

First, step (i) may be a step of removing an oxide layer present on surfaces of Si or $SiO_x$ (0<x<2) particles using an etching solution.

That is, step (i) is a step of removing the oxide layer present on the surfaces of Si or $SiO_x$ (0<x<2) particles, wherein the removing of the oxide layer may be a process of performing a surface treatment so that the Si or $SiO_x$ (0<x<2) particles may be more smoothly and uniformly coated with the metal catalyst using electroless metal deposition.

Specifically, the Si or $SiO_x$ (0<x<2) particles are immersed in the etching solution heated to a temperature of about 20° C. to about 90° C., and then stirred for about 30 minutes to about 3 hours to remove the natural oxide layer ($SiO_2$) present on the surfaces of the Si or $SiO_x$ (0<x<2) particles.

The etching solution usable according to an embodiment of the present invention may include at least one solution selected from the group consisting of hydrogen fluoride (HF), hydrofluosilicic acid ($H_2SiF_6$), and ammonium fluoride ($NH_4F$), and for example, the etching solution may be hydrogen fluoride (HF).

A concentration of the etching solution may be in a range of 5 M to 20 M.

Also, step (ii) may be a step of forming nonlinear pores in the Si or $SiO_x$ (0<x<2) particles by etching the Si or $SiO_x$ (0<x<2) particles by mixing and stirring the etching solution including the Si or $SiO_x$ (0<x<2) particles with a metal catalyst.

According to an embodiment of the present invention, the average particle diameter and shape of the pores, which may be formed in the Si or $SiO_x$ (0<x<2) particles, may be controlled according to the type and concentration of the metal catalyst and etching (stirring) time.

That is, a metal is uniformly deposited on the surfaces of the Si or $SiO_x$ (0<x<2) particles through electroless metal deposition and simultaneously, etching is performed by adding the metal catalyst to the etching solution including the Si or $SiO_x$ (0<x<2) particles having the oxide layer removed therefrom, and mixing and stirring the solution. Thus, nonlinear pores may be formed.

The metal catalyst usable according to an embodiment of the present invention may include any one selected from the group consisting of copper (Cu), platinum (Pt), and nickel (Ni), or two or more elements thereof, and for example, the metal catalyst may include Cu.

Figure 2:
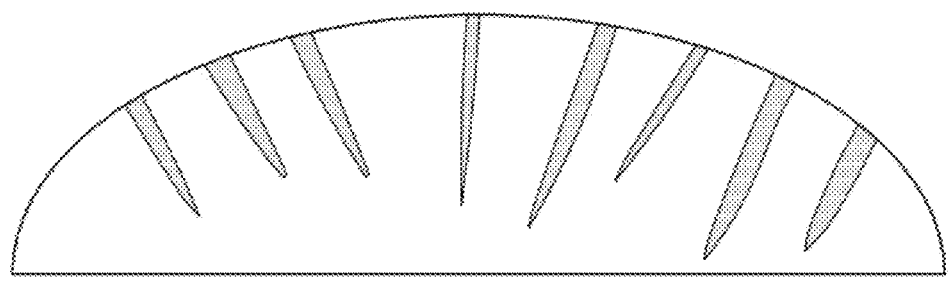
FIG. 2 is a schematic view illustrating a porous silicon-based particle including linear pores.

A metal catalyst used in a typical chemical etching method may include silver. When comparing the metal catalyst including copper, platinum, and nickel with the metal catalyst including silver, there is a similarity in that only a portion contacted with the catalyst is etched. However, in the case that the metal catalyst including silver is used, since etching occurs in a direction perpendicular to the surface of a Si or $SiO_x$ (0<x<2) particle as in a schematic view illustrated in FIG. 2, pores may be linearly formed.

In contrast, in the case in which the metal catalyst including copper, platinum, or nickel according to the embodiment of the present invention is used, since the shape of crystals of the metal catalyst is rectangular, a deposition may occur in the form of a rectangle. Also, since etching is not affected by the crystallinity of Si or $SiO_x$ (0<x<2), the etching may occur in the form of nonlinear pores having no directionality (see FIG. 1). Furthermore, since the etching occurs in which an etched portion is in the shape of a corn as it gradually moves into the Si or $SiO_x$ (0<x<2) particles, the average diameter of the nonlinear pores may gradually decrease in the direction of the center of the particle.

The metal catalyst is not particularly limited so long as it includes the above metal element, but may be in the form of a salt including the above metal. In this case, an anion of the salt may include any one selected from the group consisting of nitric acid ($NO_3^-$), sulfuric acid ($SO_4^{2-}$), iodine ($I^-$), perchlorate ($ClO_4^-$), and acetic acid ($CH_3COO^-$), or a mixture of two or more thereof.

A concentration of the metal catalyst may be in a range of 5 mM to 100 mM.

According to an embodiment of the present invention, the etching (stirring) time may be in a range of about 3 hours to about 24 hours, and the formation degree of the nonlinear pores may be changed by the etching time.

In the case that the etching time is less than 3 hours, since the desired pores of the present invention may not be formed, the desired effect of the present invention may not be obtained. In the case in which the etching time is greater than 24 hours, since the etching does not occur anymore due to the consumption of the etching solution, processing time only increases and there is no effect due to the etching time. Also, since cracks are observed on the surfaces of the porous silicon-based particles and the Si or $SiO_x$ (0<x<2) particles are over-etched, mechanical properties of the anode active material may deteriorate.

According to an embodiment of the present invention, the deposition of the metal catalyst may be performed for about 1 hour to about 12 hours. Also, in terms of process efficiency such as time and costs, both the deposition of the metal catalyst and the etching may be simultaneously performed by mixing and stirring the etching solution including the Si or $SiO_x$ (0<x<2) particles having the oxide layer removed therefrom with the metal catalyst.

Also, according to an embodiment of the present invention, a weak oxidant may be further added to the etching solution in step (ii). In this case, the weak oxidant may increase a chemical etching rate, may further form additional pores through the oxidation of silicon, and may promote the etching in order for the pores to be connected one another. Thus, the weak oxidant may increase the average diameter of the pores formed by the metal catalyst.

In the case that a strong oxidant is used in the etching process, since the strong oxidant may excessively increase the chemical etching rate in comparison to the weak oxidant, the silicon along with the metal may be vertically etched. Thus, it may be difficult to form the desired nonlinear pores of the present invention.

The weak oxidant usable according to the embodiment of the present invention may include any one selected from the group consisting of phosphite, sulfite, and phosphate, or a mixture of two or more thereof. For example, phosphite may be used and a concentration of the weak oxidant may be in a range of 0.25 M to 1.0 M.

Also, according to an embodiment of the present invention, after the formation of the nonlinear pores in the Si or $SiO_x$ (0<x<2) particles in step (ii), removing the metal catalyst remaining in the particles may be further included.

The Si or $SiO_x$ (0<x<2) particles having the nonlinear pores formed therein may be in contact with a metal removal solution to remove the metal catalyst.

The metal removal solution used may include any one selected from the group consisting of nitric acid ($HNO_3$), sulfuric acid ($H_2SO_4$), and hydrochloric acid (HCl), or a mixture of two or more thereof.

Also, the porous silicon-based particle may further include a carbon coating layer on the porous silicon-based particle.

A method of forming the carbon coating layer may be a typical coating method using a carbon precursor and, for example, after the etching, the method of forming the carbon coating layer may further include coating outer surfaces of the porous silicon-based particles with carbon by mixing the porous silicon-based particles with a carbon precursor and then performing a heat treatment.

Any carbon precursor may be used without limitation so long as it may form carbon by a heat treatment, and for example, pitch or a hydrocarbon-based material may be used. Examples of the hydrocarbon-based material may be furfuryl alcohol or a phenol-based resin.

According to an embodiment of the present invention, the carbon precursor may be used in an amount of 10 wt % to 40 wt % based on a total weight of the porous silicon-based particles.

In the case that the carbon precursor is used in an amount of less than 10 wt %, since a uniform coating layer may not be formed, electrical conductivity may be reduced. In the case in which the carbon precursor is used in an amount of greater than 40 wt %, since surface pores and inner pores of the porous silicon-based particles may be entirely coated with a carbon material, a performance improvement effect caused by a porous structure may not be obtained and capacity and initial efficiency may be reduced due to the occurrence of an additional irreversible reaction.

Also, for example, tetrahydrofuran (THF) and alcohol may be used as a solvent for forming the carbon coating layer, and the coating may be performed by performing a heat treatment in a temperature range of 300° C. to 1,400° C.

A porosity of the porous silicon-based particle according to the embodiment of the present invention is in a range of 5% to 90%, may be in a range of 10% to 70%, and for example, may be in a range of 10% to 40% based on a total volume of the porous silicon-based particle.

Herein, the porosity (%) may be defined as follows:

$$\text{Porosity}(\%)=\{1-(\text{bulk density of porous silicon particle}/\text{bulk density of pure silicon particle})\}\times 100.$$

The measurement of the porosity is not particularly limited. According to an embodiment of the present invention, the porosity, for example, may be measured by a BET method or mercury (Hg) porosimetry.

In the case that the porosity of the porous silicon-based particle is less than 5%, the volume expansion of the anode active material during charge and discharge may not be suppressed. In the case in which the porosity of the porous silicon-based particle is greater than 90%, mechanical strength may be decreased due to a plurality of pores included in the anode active material, and thus, the anode active material may be fractured during manufacturing processes (slurry mixing, pressing after coating, etc.) of a battery.

Also, the present invention may provide an anode active material including the porous silicon-based particles.

The anode active material according to an embodiment of the present invention may further include a carbon-based material. That is, the anode active material may be used in a secondary battery by mixing the porous silicon-based particles with a typically used carbon-based material.

The typically used carbon-based material may be at least one selected from the group consisting of natural graphite, artificial graphite, meso-carbon microbeads (MCMB), carbon fibers, and carbon black.

The carbon-based material may be included in an amount of 0 parts by weight to 90 parts by weight, for example, 70 parts by weight to 95 parts by weight based on 100 parts by weight of the porous silicon-based particles.

The present invention may also provide an anode including the anode active material.

Furthermore, the present invention may provide a lithium secondary battery including a cathode, an anode, a separator disposed between the cathode and the anode, and an electrolyte in which a lithium salt is dissolved, wherein the anode includes an anode active material including the porous silicon-based particles.

The anode active material thus prepared may be used to prepare an anode by a typical method in the art. For example, the anode active material according to the embodiment of the present invention is mixed with a binder, a solvent, and a conductive agent and a dispersant if necessary, and stirred to prepare a slurry. Then, a current collector may be coated with the slurry and pressed to prepare an anode.

Various types of binder polymers, such as a polyvinylidene fluoride-hexafluoropropylene copolymer (PVDF-co-HEP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, poly acrylic acid, and a polymer having hydrogen thereof substituted with lithium (Li), sodium (Na), and calcium (Ca), or various copolymers, may be used as the binder. N-methyl pyrrolidone, acetone, or water may be used as the solvent.

Any conductive agent may be used without particular limitation so long as it has suitable conductivity without causing adverse chemical changes in the batteries. For example, the conductive agent may include a conductive material such as: graphite such as natural graphite and artificial graphite; carbon black such as acetylene black, Ketjen black, channel black, furnace black, lamp black, and thermal black; conductive fibers such as carbon fibers and metal fibers; conductive tubes such as carbon nanotubes; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives.

An aqueous-based dispersant or an organic dispersant, such as N-methyl-2-pyrrolidone, may be used as the dispersant.

Similar to the preparation of the anode, a cathode active material, a conductive agent, a binder, and a solvent are mixed to prepare a slurry, and a cathode may then be prepared by directly coating a metal current collector with the slurry or by casting the slurry on a separate support and laminating a cathode active material film separated from the support on a metal current collector.

Examples of the cathode active material may be a layered compound, such as lithium cobalt oxide ($LiCoO_2$), lithium nickel oxide ($LiNiO_2$), $Li[Ni_xCo_yMn_zM_v]O_2$ (where M is any one selected from the group consisting of aluminum (Al), gallium (Ga), and indium (In), or two or more elements thereof; and $0.3 \leq x < 0.1$, $0 \leq y$, $z \leq 0.5$, $0 \leq v \leq 0.1$, and $x+y+z+v=1$), $Li(Li_aM_{b-a-b'}M'_{b'})O_{2-c}A_c$ (where $0 \leq a \leq 0.2$, $0.6 \leq b \leq 1$, $0 \leq b' \leq 0.2$, and $0 \leq c \leq 0.2$; M includes manganese (Mn) and at least one selected from the group consisting of Ni, cobalt (Co), iron (Fe), chromium (Cr), vanadium (V), Cu, zinc (Zn), and titanium (Ti); M' is at least one selected from the group consisting of Al, magnesium (Mg), and boron (B); and A is at least one selected from the group consisting of phosphorus (P), fluorine (F), sulfur (S), and nitrogen (N)), or a compound substituted with at least one transition metal; lithium manganese oxides such as the chemical formula $Li_{1+y}Mn_{2-y}O_4$ (where y ranges from 0 to 0.33), $LiMnO_3$, $LiMn_2O_3$, and $LiMnO_2$; lithium copper oxide ($Li_2CuO_2$); vanadium oxides such as $LiV_3O_8$, $LiFe_3O_4$, $V_2O_5$, and $Cu_2V_2O_7$; Ni-site type lithium nickel oxide expressed by the chemical formula $LiNi_{1-y}M_yO_2$ (where M is Co, Mn, Al, Cu, Fe, Mg, B, or Ga, and y ranges from 0.01 to 0.3); lithium manganese complex oxide expressed by the chemical formula $LiMn_{2-y}M_yO_2$ (where M is Co, Ni, Fe, Cr, Zn, or tantalum (Ta), and y ranges from 0.01 to 0.1) or $Li_2Mn_3MO_8$ (where M is Fe, Co, Ni, Cu, or Zn); $LiMn_2O_4$ having a part of Li being substituted with alkaline earth metal ions; a disulfide compound; and $Fe_2(MoO_4)_3$. However, the cathode active material is not limited thereto.

A typical porous polymer film used as a typical separator, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers, and a polymer separator base material having at least one surface thereof coated with ceramic may be used. However, the present invention is not limited thereto.

In an electrolyte solution used in an embodiment of the present invention, a lithium salt, which may be included as the electrolyte, may be used without limitation so long as it is typically used in an electrolyte solution for a secondary battery. For example, one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used as an anion of the lithium salt.

In the electrolyte solution used in an embodiment of the present invention, an organic solvent included in the electrolyte solution may be used without limitation so long as it is typically used in the art. Typically, any one selected from the group consisting of propylene carbonate, ethylene carbonate, diethyl carbonate, dimethyl carbonate, ethylmethyl carbonate, methylpropyl carbonate, dipropyl carbonate, fluoro-ethylene carbonate, dimethyl sulfoxide, acetonitrile, dimethoxyethane, diethoxyethane, vinylene carbonate, sulfolane, γ-butyrolactone, propylene sulfite, tetrahydrofuran, methyl formate, methyl acetate, ethyl acetate, isopropyl acetate, isoamyl acetate, methyl propionate, ethyl propionate, propyl propionate, butyl propionate, methyl butylate, and ethyl butylate, or a mixture of two or more thereof may be used.

In particular, ethylene carbonate and propylene carbonate, ring-type carbonates among the carbonate-based organic solvents, well dissociate the lithium salt in the electrolyte due to high dielectric constants as high-viscosity organic solvents, and thus, the ring-type carbonate may be used. Since an electrolyte having high electrical conductivity may be prepared when the ring-type carbonate is mixed with low-viscosity, low-dielectric constant linear carbonate, such as dimethyl carbonate and diethyl carbonate, in an appropriate ratio, the ring-type carbonate, for example, may be used.

Selectively, the electrolyte stored according to the present invention may further include an additive, such as an overcharge inhibitor, that is included in a typical electrolyte.

A separator is disposed between the cathode and the anode to form an electrode assembly, the electrode assembly is put in a cylindrical battery case or prismatic battery case or aluminum pouch, and a secondary battery is then completed when the electrolyte is injected thereinto. Also, the electrode assembly is stacked and impregnated with the electrolyte solution, and a lithium secondary battery is then completed when the product thus obtained is put in a battery case and sealed.

The lithium secondary battery according to the present invention may not only be used in a battery cell that is used as a power source of a small device, but may also be used as a unit cell in a medium and large sized battery module including a plurality of battery cells. Preferred examples of the medium and large sized device may be an electric vehicle, a hybrid electric vehicle, a plug-in hybrid electric vehicle, or a power storage system, but the medium and large sized device is not limited thereto.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present inventive concept to those skilled in the art.

EXAMPLES

<Preparation of Porous Silicon Particles>

Example 1

<Step (i): Removing Oxide Layer Present on Surfaces of Si or $SiO_x$ (0<x<2) Particles Using Etching Solution>

Silicon in a powder state was immersed in 8.5 M hydrogen fluoride heated to a temperature of 50° C., and then stirred for about 30 minutes. A natural oxide layer ($SiO_2$) present on the surface of the silicon in a powder state was removed through the above process. Thus, silicon particles having the oxide layer removed therefrom were obtained by performing a surface treatment which may allow the Si or $SiO_x$ (0<x<2) particles to be more smoothly and uniformly coated with the metal catalyst using electroless metal deposition.

<Step (ii): Forming Nonlinear Pores in the Si or $SiO_x$ (0<x<2) Particles by Etching the Si or $SiO_x$ (0<x<2) Particles by Mixing and Stirring the Etching Solution Including the Si or $SiO_x$ (0<x<2) Particles Having the Oxide Layer Removed Therefrom with Metal Catalyst>

A 15 mM copper sulfate ($CuSO_4$) aqueous solution prepared at the same volume as that of the hydrogen fluoride was added to an aqueous solution including silicon having the oxide layer ($SiO_2$) removed therefrom that was obtained in step (i), in which 8.5 M hydrogen fluoride was mixed, and stirred for about 3 hours to perform etching. Copper was deposited on the surface of the silicon having the oxide layer ($SiO_2$) removed therefrom through the above process, and simultaneously, the etching was performed.

In the aqueous solution state, the remaining hydrogen fluoride was removed by washing porous silicon particles several times using a filter press capable of simultaneously filtering, washing, and dehydrating. Thereafter, the solution thus obtained was filtered, dehydrated, and dried at about 150° C. for about 1 hour to obtain porous silicon particles in which nonlinear pores were connected to one another.

In order to remove copper remaining on the porous silicon particles prepared by the above method, nitric acid was heated to a temperature of 50° C., and the porous silicon particles were then immersed in the nitric acid for about 2 hours to remove the copper.

Examples 2 to 6

Porous silicon particles were prepared in the same manner as in Example 1 except that a 15 mM copper sulfate ($CuSO_4$) aqueous solution prepared at the same volume as that of the hydrogen fluoride was added to an aqueous solution including silicon having the oxide layer ($SiO_2$) removed therefrom that was obtained in step (i), in which 8.5 M hydrogen fluoride was mixed, and stirred for about 6 hours, 9 hours, 12 hours, 18 hours, and 24 hours, respectively.

Example 7

<Step (i): Removing Oxide Layer Present on Surfaces of Si or $SiO_x$ (0<x<2) Particles Using Etching Solution>

Silicon in a powder state was immersed in 17.5 M hydrogen fluoride heated to a temperature of 50° C., and then stirred for about 30 minutes. A natural oxide layer ($SiO_2$) present on the surface of the silicon in a powder state was removed through the above process. Thus, silicon particles having the oxide layer removed therefrom were obtained by performing a surface treatment which may allow the Si or $SiO_x$ (0<x<2) particles to be more smoothly and uniformly coated with the metal catalyst using electroless metal deposition.

<Step (ii): Forming Nonlinear Pores in the Si or $SiO_x$ (0<x<2) Particles by Etching the Si or $SiO_x$ (0<x<2) Particles by Mixing and Stirring the Etching Solution Including the Si or $SiO_x$ (0<x<2) Particles Having the Oxide Layer Removed Therefrom with Metal Catalyst>

A 30 mM copper sulfate ($CuSO_4$) aqueous solution prepared at the same volume as that of the hydrogen fluoride was added to an aqueous solution, in which 17.5 M hydrogen fluoride and silicon having the oxide layer ($SiO_2$) removed therefrom that was obtained in step (i) were mixed, and stirred for about 1 hour. Copper was uniformly deposited on the surface of the silicon having the oxide layer ($SiO_2$) removed therefrom through the above process.

In the aqueous solution including silicon having the oxide layer ($SiO_2$) removed therefrom in which 17.5 M hydrogen fluoride was mixed, a 0.5 M phosphite ($H_3PO_3$) aqueous solution was prepared to have ⅓ of the volume of the hydrogen fluoride, and was then added to the aqueous solution including the copper-deposited silicon that was obtained in the above metal deposition step. When this mixture was mixed at 50° C. for about 21 hours, a portion deposited with copper and a surface oxidized by phosphite were only selectively etched by chemical etching, and thus, porous silicon was prepared in which nonlinear pores were connected to one another.

In this case, the copper deposited on the silicon was used as a catalyst reducing silicon and the phosphite was used as a weak oxidant oxidizing the silicon to increase a chemical etching rate.

That is, the phosphite used as a weak oxidant may increase the size of the pore formed by the copper or may form additional pores through the oxidation of the silicon.

Comparative Example 1

Porous silicon particles were prepared in the same manner as in Example 1 except that a silver nitrate aqueous solution was used instead of a copper sulfate ($CuSO_4$) aqueous solution in step (ii) of Example 1.

Comparative Example 2

Porous silicon particles were prepared in the same manner as in Example 7 except that an iron nitrate ($Fe(NO_3)_3$) (or other strong oxidants) was used instead of a 0.5 M phosphite ($H_3PO_3$) aqueous solution in step (ii) of Example 7.

Comparative Example 3

Porous silicon particles were prepared in the same manner as in Example 1 except that etching was performed for 28 hours in step (ii) of Example 1.

Comparative Example 4

Porous silicon particles were prepared in the same manner as in Example 1 except that etching was performed for 1 hour in step (ii) of Example 1.

<Preparation of Secondary Battery>

Example 8

The porous silicon-based particles prepared in Example 1 were used as an anode active material. The anode active material, acetylene black as a conductive agent, and polyvinylidene fluoride as a binder were mixed at a weight ratio of 70:10:20, and the mixture was mixed with a N-methyl-2-pyrrolidone solvent to prepare a slurry. One surface of a copper current collector was coated with the prepared slurry to a thickness of 30 μm, dried, and rolled. Then, an anode was prepared by punching into a predetermined size.

10 wt % fluoroethylene carbonate based on a total weight of an electrolyte solution was added to a mixed solvent, which includes 1.0 M $LiPF_6$ and an organic solvent prepared by mixing ethylene carbonate and diethyl carbonate at a weight ratio of 30:70, to prepare a non-aqueous electrolyte solution.

A lithium foil was used as a counter electrode, a polyolefin separator was disposed between both electrodes, and a coin-type half cell was then prepared by injecting the electrolyte solution.

Examples 9 to 14

Coin-type half cells were prepared in the same manner as in Example 8 except that the porous silicon-based particles prepared in Examples 2 to 7 were used as an anode active material instead of using the porous silicon-based particles prepared in Example 1.

Example 15

A coin-type half cell was prepared in the same manner as in Example 8 except that the porous silicon particles prepared in Example 5 were coated with 10 wt % of carbon and an anode active material was used in which the carbon-coated porous silicon particles and graphite were mixed at a ratio of 50:50.

Comparative Example 5

A coin-type half cell was prepared in the same manner as in Example 8 except that pure Si particles were used as an anode active material instead of using the porous silicon-based particles prepared in Example 1.

Comparative Examples 6 to 9

Coin-type half cells were prepared in the same manner as in Example 8 except that the porous silicon-based particles prepared in Comparative Examples 1 to 4 were used as an anode active material instead of using the porous silicon-based particles prepared in Example 1.

Comparative Example 10

A coin-type half cell was prepared in the same manner as in Example 8 except that the porous silicon particles prepared in Comparative Example 4 were coated with 10 wt % of carbon and an anode active material was used in which the carbon-coated porous silicon particles and graphite were mixed at a ratio of 50:50.

Experimental Example 1

<Scanning Electron Microscope (SEM) Images>

Surface morphologies of nonlinear pores included in the porous silicon-based particles obtained in Examples 1 to 6 according to etching time were identified with an SEM. The results thereof are presented in FIG. 3.

Figure 3:
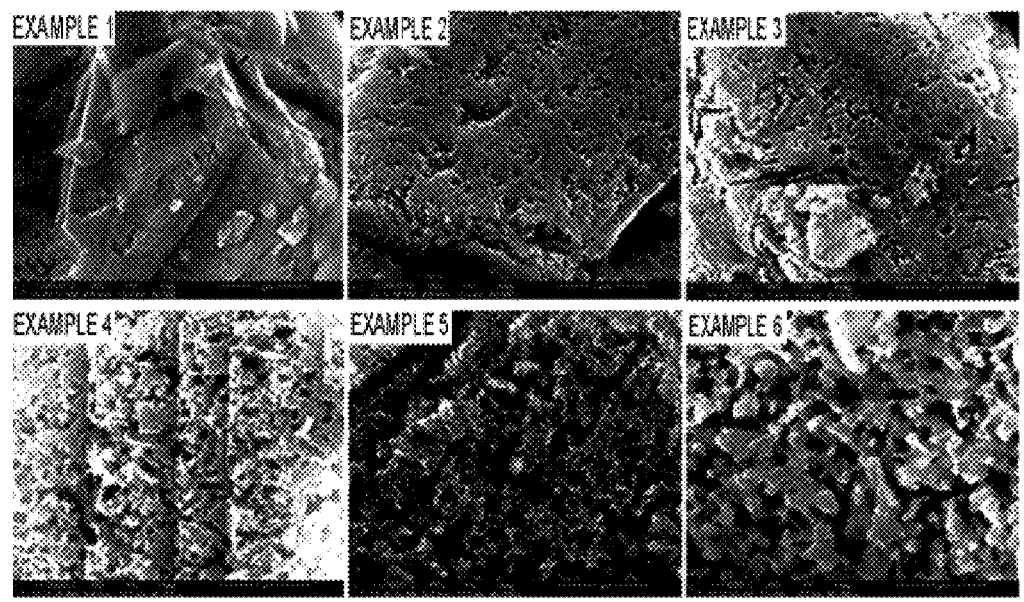
FIG. 3 is scanning electron microscope (SEM) images showing pore shapes of porous silicon-based particles prepared in Examples 1 to 6 of the present invention according to etching time.

Referring to FIG. 3, it may be confirmed that pores were formed in the surface of the porous silicon-based particle of Example 1 in which the etching was performed for 3 hours, and the formation degree and diameter of the pores, which were formed in the particle, tended to increase as the etching time increased to 6 hours, 9 hours, 12 hours, 18 hours, and 24 hours as in Examples 2 to 6.

Also, it may be confirmed that at least two or more pores of the nonlinear pores included in the porous silicon-based particles of Examples 2 to 6, in which the etching was performed for 6 hours or more, were connected to each other.

With respect to Example 6 in which the etching was performed for about 24 hours, it may be confirmed that the nonlinear pores included in the porous silicon particles were almost connected to one another, and it was also confirmed that a depth of the pore was the largest in Example 6 in which the etching was performed for about 24 hours.

It was considered that the depth of the nonlinear pore of the particle was increased because the size of copper, as a metal catalyst, deposited on the surface of silicon was increased by hydrogen fluoride as the etching time increased.

Surface morphologies of the porous silicon particles of Example 7, in which etching was performed using phosphite ($H_3PO_3$) as a weak oxidant, were identified with an SEM. The results thereof are presented in FIG. 4.

Figure 4:
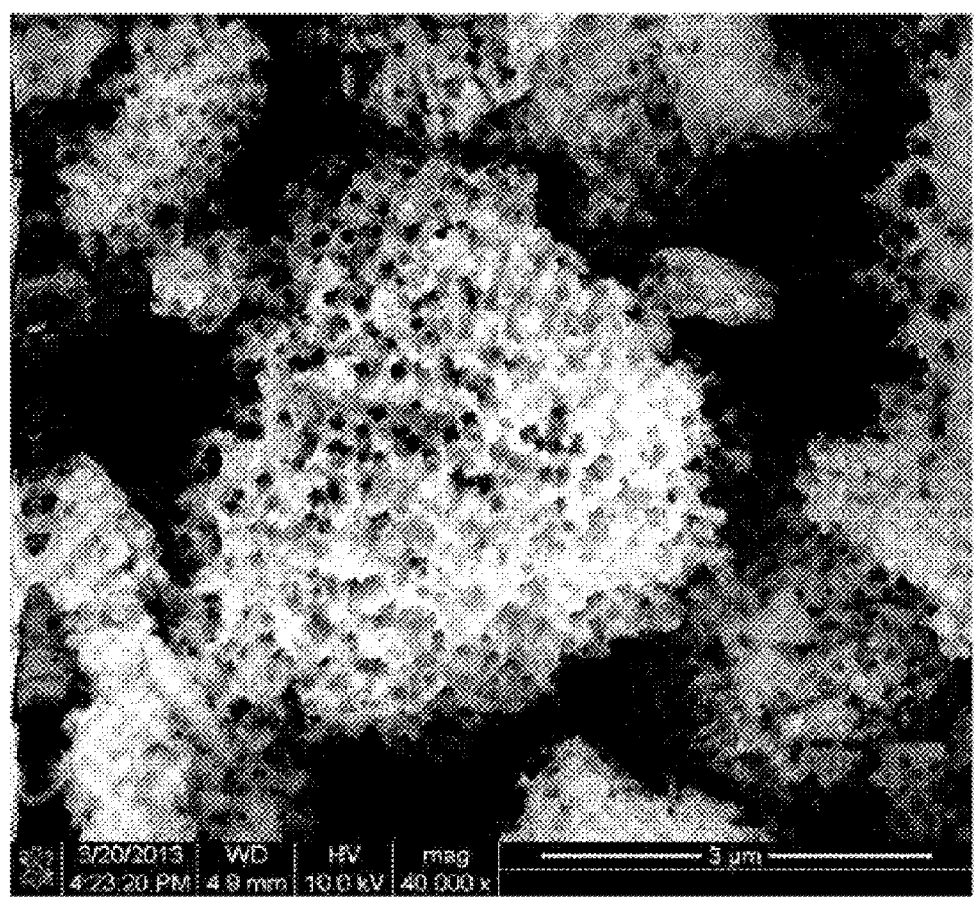
FIG. 4 is an SEM image showing a surface shape of porous silicon-based particles prepared in Example 7 of the present invention.

As illustrated in FIG. 4, it may be observed that a plurality of nonlinear pores was formed on the entire porous silicon particles, and the nonlinear pores were formed as open pores in the surfaces of the particles. Also, it was confirmed that an average diameter of the nonlinear pores was in a range of about a few tens to a few hundreds of nanometers.

When compared to silver used as a catalyst of a typical chemical etching method, there was a similarity in that only a portion contacted with the catalyst was etched. However, in the case that silver was used as a catalyst, since etching occurred in a direction perpendicular to the surface of the silicon, pores in the form of a linear wire may be formed (see FIGS. 2 and 6).

In contrast, in the case in which copper was used as a catalyst as in the embodiment of the present invention, it may be confirmed that since the shape of copper crystals was rectangular, copper deposition may occur in the form of a rectangle. It may be also confirmed that since etching is not affected by the crystallinity of silicon, the etching may occur in the form of nonlinear pores having no directionality.

Figure 5:
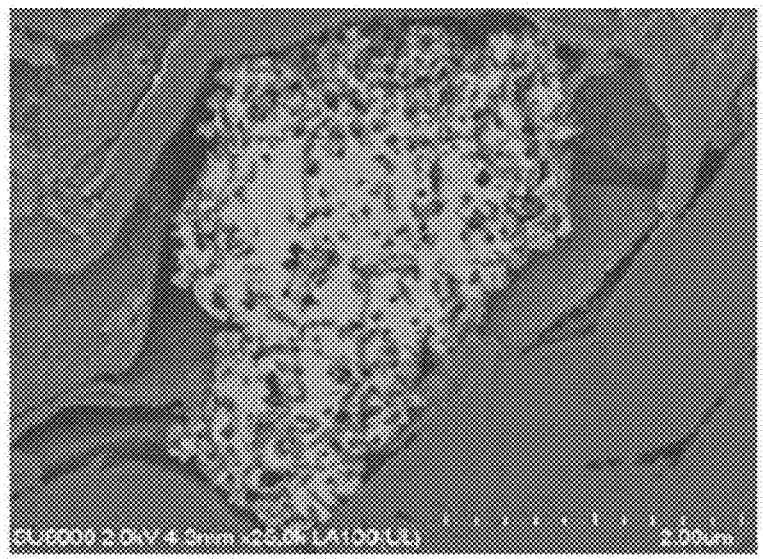
FIG. 5 is an SEM image showing an internal cross-section of a porous silicon-based particle prepared in Example 7 of the present invention.

FIG. 5 is an electron microscope image showing an internal cross-section of the porous silicon particle obtained in Example 7 after sectioning.

In order to identify morphologies of the internal cross-section of the porous silicon particle prepared in Example 7, the porous silicon particle was cross-sectioned using an argon (Ar)-ion milling apparatus and the internal cross-section was then analyzed with an electron microscope.

Referring to FIG. 5, it was confirmed that pores of the porous silicon particle prepared in Example 7 were formed up to the inside of the particle, and it may be confirmed that the nonlinear pores having no directionality were connected to one another in the porous silicon particle.

When comparing average diameters of the pores formed in the inside/outside of the porous silicon particle, it was confirmed that the average diameter of the pores formed in the inside thereof tended to be smaller than the average diameter of the pores formed in the outside thereof.

It was considered that there was no effect on the copper catalyst due to the crystal direction of silicon, the etching occurred without directionality, and the etching occurred in which an etched portion was in the shape of a nonlinear corn as it gradually moves in the direction of the center of the porous silicon particle.

Also, it may be estimated that the average diameter of the internal pores tended to be gradually decreased in the direction of the center of the particle in comparison to the surface of the porous silicon particle due to the additional pore formation and the active connection between the pores by the phosphite.

Figure 6:
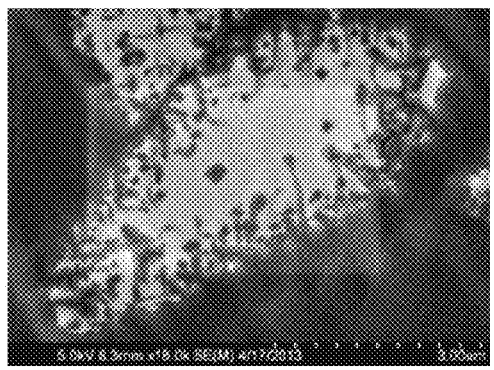
FIG. 6 is an SEM image showing an internal cross-section of a porous silicon-based particle including nonlinear pores prepared in Comparative Example 1.

In contrast, referring to FIG. 6 illustrating an internal cross-section of the silicon-based particle prepared in Example 1, it may be confirmed that since the etching occurred in a direction perpendicular to the surface of the silicon, pores may be linearly formed.

Experimental Example 2

Measurements of Physical Properties of Porous Silicon-based Particles

Tap densities (g/cc), total mercury intrusion volumes (mL/g), bulk densities (g/cc), and porosities (%) of the porous silicon-based particles prepared in Examples 1 to 6 were measured and the results thereof are presented in Table 1 below.

<Tap Density Measurement>

The porous silicon-based particles obtained in Examples 1 to 6 were respectively charged into a container and, as the tap density of the particles, an apparent density of the particles was measured by vibrating under a predetermined condition.

<Mercury Porosimetry>

The total mercury intrusion volumes (mL/g) were measured by using a mercury porosimeter (AutoPore VI 9500, Micromerities, USA).

The mercury porosimetry uses a capillary phenomenon by which a liquid infiltrates into a fine pore. A non-wetting liquid, such as mercury, can infiltrate when a pressure is applied from the outside, and the smaller the size of the pore is, the higher the pressure is required. The measurement results may be represented by a function of a cumulative volume of mercury intruded according to the pressure (or size of the pore).

Operating Principle

Porous silicon particles were put in a penetrometer and sealed, and a vacuum was then applied and mercury was filled. When the pressure was applied to the penetrometer, the mercury infiltrated into the pores of the porous silicon particles to reduce the height of the mercury of the penetrometer. When the reduction was measured as a function of the pressure, the volume of the mercury infiltrated into the pores may be obtained. The mercury intrusion results may be represented by a pore radius or intrusion pressure and a cumulative intrusion volume per sample weight.

Since the mercury intruded into the pores between the particles when the pressure was low, the size of the pore may decrease as the pressure increased. In a sample formed of porous powder, a cumulative intrusion curve may be a bimodal curve due to these pores.

<Bulk Density Measurement>

The bulk density of the porous silicon-based particles may be obtained by using a total intrusion volume when the pressure was maximum during the mercury porosimetry, i.e., when the mercury intrusion did not occur anymore.

<Porosity Measurement>

The porosities of the porous silicon-based particles obtained in Examples 1 to 6 were calculated by using Equation 1 below.

$$\text{Porosity}(\%) = \{1-(\text{bulk density of the porous silicon particles of Examples 1 to 6/bulk density of pure silicon particle})\} \times 100. \quad [\text{Equation 1}]$$

TABLE 1

| Sample | Etching time (h) | Tap density (g/cc) | Total mercury intrusion volume (mL/g) | Bulk density (g/cc) | Porosity (%) |
|---|---|---|---|---|---|
| Example 1 | 3 | 0.90 | 0.64 | 0.75 | 11.7 |
| Example 2 | 6 | 0.84 | 0.72 | 0.68 | 19.2 |
| Example 3 | 9 | 0.81 | 0.76 | 0.66 | 22.2 |
| Example 4 | 12 | 0.75 | 0.84 | 0.62 | 26.2 |
| Example 5 | 18 | 0.65 | 1.05 | 0.53 | 37.7 |
| Example 6 | 24 | 0.63 | 1.19 | 0.51 | 39.2 |
| Si particles | 0 | 1.02 | 0.53 | 0.85 | 0 |
| Comparative Example 1 | 3 | 0.91 | 0.62 | 0.77 | 9.5 |
| Comparative Example 2 | 21 | 0.68 | 0.91 | 0.60 | 29.4 |
| Comparative Example 3 | 28 | 0.80 | 0.75 | 0.65 | 23.5 |
| Comparative Example 4 | 1 | 0.94 | 0.59 | 0.79 | 7.1 |

As illustrated in Table 1, porosities of the porous silicon-based particles of Examples 1 to 6, in which nonlinear pores were formed by etching for 3 hours to 24 hours, were in a range of about 11% to about 39%. In particular, with respect to the porous silicon-based particles of Example 6 in which nonlinear pores were formed by etching for 24 hours, the porosity was close to about 40% in comparison to pure Si particles in which a treatment for forming pores was not performed.

The Si particles had a tap density of 1.02 (g/cc) and a bulk density of 0.85 (g/cc). In contrast, the porous silicon-based particles of Examples 1 to 6 had lower tap densities and bulk densities than the above tap density and bulk density.

Also, a total mercury intrusion volume of the Si particles was 0.53 g/cc and total mercury intrusion volumes of the porous silicon-based particles of Examples 1 to 6 were in a range of 0.64 g/cc to 1.19 g/cc. Thus, the total mercury intrusion volumes of the porous silicon-based particles of Examples 1 to 6 were significantly increased in comparison to that of the Si particles.

In particular, with respect to Examples 5 and 6 in which the etching was respectively performed for 18 hours and hours, the total mercury intrusion volumes were respectively 1.05 g/cc and 1.19 g/cc. Thus, the total mercury intrusion volumes were increased by 2 times or more in comparison to that of the Si particles.

In contrast, with respect to Comparative Example 1 in which the etching time was the same as that of Example 1 but a silver nitrate aqueous solution was used, the porosity was 9.5%, and thus, it may be understood that the porosity was significantly reduced in comparison to that of Example 1.

With respect to Comparative Example 3 in which the etching was performed for 28 hours, the etching solution was only consumed but there was no effect due to the excessive etching time. With respect to Comparative Example 4 in which the etching was performed for only 1 hour, the porosity was 7.1%, and thus, pores were not sufficiently formed.

Also, since the tap densities and the bulk densities of Examples 1 to 6 of the present invention were decreased and the total mercury intrusion volumes thereof were increased in comparison to those of the pure Si particles, it was considered that the depths of the formed nonlinear pores were increased and the plurality of nonlinear pores were formed according to an increase in the etching time.

In order to identify physical properties of the porous silicon particles obtained in Example 7 in which the etching was performed by using the weak oxidant, tap density (g/cc), BET specific surface area (m$^2$/g), and particle size distribution were measured, and the results thereof are presented in Table 2 below.

<Tap Density Measurement>

In this case, the tap density measurement was performed in the same manner as in the porous silicon-based particles of Examples 1 to 6.

<Specific Surface Area Measurement>

The specific surface area of the porous silicon-based particles of Example 7 may be measured by a BET method. For example, the specific surface area was measured by a 6-point BET method according to a nitrogen gas adsorption-flow method using a porosimetry analyzer (Belsorp-II mini by Bell Japan Inc.).

<Particle Size Distribution Measurement>

$D_{min}$, $D_{10}$, $D_{50}$, $D_{90}$, and $D_{max}$ were measured as an average particle size distribution of the porous silicon-based particles for the particle size distribution of the porous silicon-based particles of Example 7, and $D_{min}$, $D_{10}$, $D_{50}$, $D_{90}$, and $D_{max}$ were denoted as particle diameters at less than 10%, 10%, 50%, 90%, and greater than 90% in a cumulative particle diameter distribution, respectively.

The particle size distribution of the porous silicon-based particles of Example 7 was measured by using a laser diffraction method (Microtrac MT 3000).

density of the Si particles was 1.02 g/cc. Thus, it may be confirmed that the tap density of the porous silicon particles of Example 7 was decreased by about 0.41 g/cc in comparison to that of the Si particles.

Accordingly, as illustrated in the SEM image of Experimental Example 1, it may be estimated that pores were formed in the porous silicon particles obtained in Example 7.

As illustrated in Table 2, a BET specific surface area of the porous silicon particles obtained in Example 7 was 20.87 m$^2$/g, and a BET specific surface area of the Si particles was 1.56 m$^2$/g. Thus, the BET specific surface area of the porous silicon particles prepared in Example 7 was increased by about 13 times in comparison to that of the Si particles.

Since Example 7 and the Si particles exhibited the same particle size distribution, it was considered that the increase in the specific surface area was due to the formation of the pores.

Experimental Example 3

Hg Porosimetry Analysis

Figure 7:
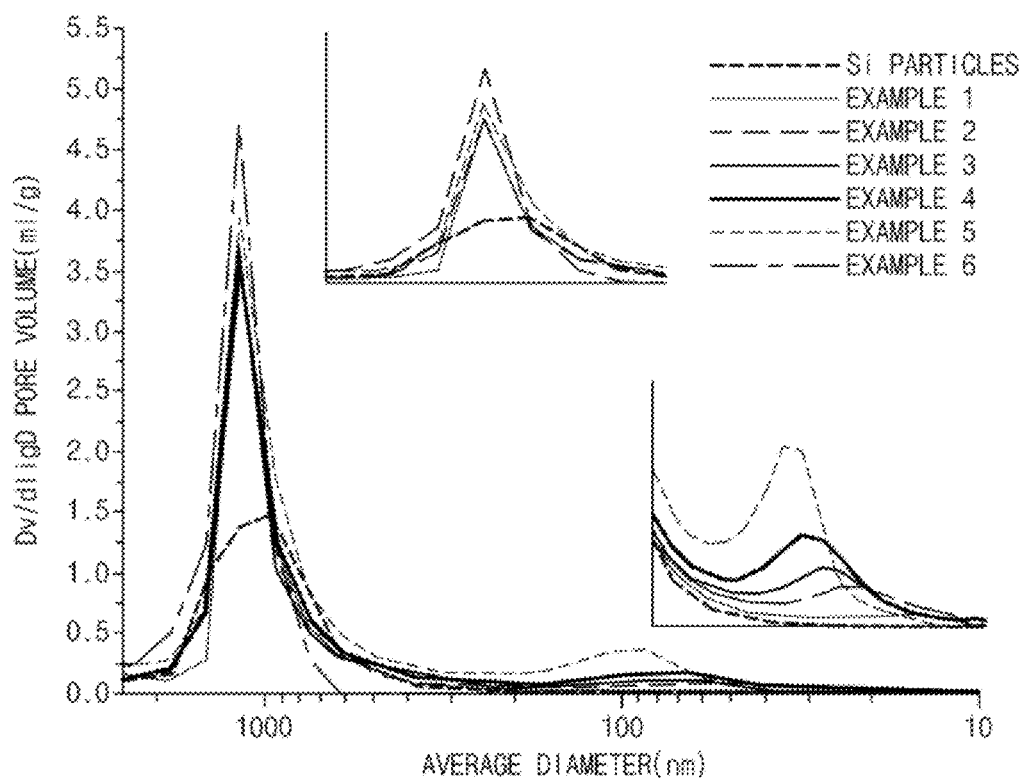
FIG. 7 is a graph illustrating pore distributions of the porous silicon-based particles prepared in Examples 1 to 6 through mercury (Hg) porosimetry analysis according to Experimental Example 3 of the present invention.

FIG. 7 illustrates pore distributions of the porous silicon-based particles prepared in Examples 1 to 6 through mercury porosimetry analysis.

Referring to FIG. 7, a rate of change in volume of mercury intruded into the pore, which was measured by mercury porosimetry of the porous silicon-based particles, had peaks in an average pore diameter range of about 30 nm to about 2,500 nm.

When examining two enlarged graphs of a graph of Example 7, the peaks respectively appeared in average pore diameter ranges of 800 nm to 2,000 nm and 50 nm to 600 nm. Herein, the peak in an average pore diameter range of 800 nm to 2,000 nm was a peak corresponding to pores between the porous silicon particles and the peak in an average pore diameter range of 50 nm to 600 nm was a peak corresponding to the nonlinear pores included in the porous silicon particles.

It may be confirmed that a total mercury intrusion volume in the average pore diameter range of 50 nm to 600 nm was in a range of 0.5 mL/g to 1.2 mL/g.

Also, referring to FIG. 7, it may be confirmed that the pore volume was increased as the etching time was increased to 3 hours, 6 hours, 9 hours, 12 hours, 18 hours, and 24 hours as in Examples 1 to 6. In particular, it may be confirmed that the porous silicon particles of Example 6, in which the etching was performed for 24 hours, exhibited the largest pore volume.

In the porous silicon particles of Examples 1 to 6, it was confirmed that the average diameter distribution of the pores was in a form in which mesopores having an average diameter of 20 nm to 100 nm and macropores coexisted until the etching time was in a range of 3 hours to 18 hours, and

TABLE 2

| Sample | Tap density (g/cc) | BET specific surface area (m$^2$/g) | Particle size distribution (μm) | | | | |
|---|---|---|---|---|---|---|---|
| | | | $D_{min}$ | $D_{10}$ | $D_{50}$ | $D_{90}$ | $D_{max}$ |
| Example 7 | 0.61 | 20.87 | 2.312 | 3.55 | 4.63 | 6.14 | 10.09 |
| Si particles | 1.02 | 1.56 | 2.312 | 3.57 | 4.65 | 6.15 | 10.09 |

As illustrated in Table 2, tap density of the porous silicon particles obtained in Example 7 was 0.61 g/cc and tap the distribution of macropores having an average diameter of 50 nm or more was increased as the etching time increased. This was considered due to the fact that the formed pores were connected to one another as the etching time increased.

Furthermore, it was confirmed that the porous silicon particles of Example 5, which were etched for 18 hours, had a pore distribution in which macropores having an average diameter of 50 nm or more were mostly formed.

It was considered that the porous silicon particles of Example 6, which were etched for 24 hours, had a pore shape in which pores were almost combined and connected to one another.

Experimental Example 4

Life Characteristics and Thickness Change Rate Analysis

The following experiments were performed in order to investigate life characteristics and thickness change rates of the secondary batteries prepared in Examples 8 to 15 and Comparative Examples 5 to 10.

Life characteristics of each secondary battery were measured by performing charge and discharge at 0.1 C in a first cycle and performing charge and discharge at 0.5 C in subsequent cycles. The life characteristics were represented as a ratio of discharge capacity in a 49th cycle to the first cycle discharge capacity. Each secondary battery was disassembled in a charge state of a 50th cycle and a thickness of an electrode was measured. Then, a thickness change rate was obtained by comparing the above thickness with a thickness of the electrode before the first cycle.

The following Table 3 presents life characteristics and thickness change rates of the secondary batteries prepared in Examples 8 to 15 and Comparative Examples 5 to 10.

TABLE 3

| Examples | Remarks | Life characteristics (%) | Thickness change rate (%) |
|---|---|---|---|
| Example 8 | 3 hr etching | 65 | 250 |
| Example 9 | 6 hr etching | 70 | 230 |
| Example 10 | 9 hr etching | 75 | 200 |
| Example 11 | 12 hr etching | 80 | 180 |
| Example 12 | 18 hr etching | 85 | 170 |
| Example 13 | 24 hr etching | 85 | 150 |
| Example 14 | 21 hr etching, use $H_3PO_3$ | 85 | 150 |
| Example 15 | 18 hr etching + 10 wt % carbon coating (50/50 mixed anode) | 90 | 120 |
| Comparative Example 5 | Pure Si | 55 | 300 |
| Comparative Example 6 | 3 hr etching, use $AgNO_3$ | 65 | 270 |
| Comparative Example 7 | 21 hr etching, use strong oxidant | 75 | 180 |
| Comparative Example 8 | 28 hr etching | 70 | 200 |
| Comparative Example 9 | 1 hr etching | 60 | 300 |
| Comparative Example 10 | 1 hr etching + 10 wt % carbon coating (50/50 mixed anode) | 70 | 180 |

Life characteristics: (discharge capacity in a 49th cycle/first cycle discharge capacity) × 100
Thickness change rate: (electrode thickness in a charge state of a 50th cycle − electrode thickness before a first cycle)/electrode thickness before the first cycle × 100

As illustrated in Table 3, it may be confirmed that the secondary batteries of Examples 8 to 15 of the present invention had significantly better life characteristics and thickness change rate than those of Comparative Examples 5 to 10.

Specifically, when particularly comparing Example 8 and Comparative Example 6 in which the etching was performed for 3 hours, it may be confirmed that the thickness change rate of Example 8 using the copper sulfate aqueous solution as a metal catalyst was decreased in comparison to that of Comparative Example 6 using silver nitrate.

Also, when comparing Example 14 and Comparative Example 7 in which the etching was performed for 21 hours, it may be confirmed that both the life characteristics and the thickness change rate of Example 14 using phosphite as a weak oxidant were better than those of Comparative Example 7 using iron nitrate as a strong oxidant.

In the case that graphite and the porous silicon particles coated with 10 wt % carbon were mixed as in Example 15, the life characteristics was 90% and the thickness change rate was 120%. Thus, it may be understood that the performance of the secondary battery was significantly improved.

In contrast, with respect to Example 9 in which the etching was performed for only 1 hour, the thickness change rate was 300%, and thus, it may be confirmed that the volume expansion was not reduced due to the insufficient formation of the pores.

INDUSTRIAL APPLICABILITY

Porous silicon-based particles according to an embodiment of the present invention may be more easily dispersed in an anode active material slurry, may minimize side reactions with an electrolyte, and may reduce volume expansion during charge and discharge by including Si or $SiO_x$ ($0<x<2$) particles having a plurality of nonlinear pores. Thus, the porous silicon-based particles may be suitable for a secondary battery.

The invention claimed is:

1. A porous silicon-based particle, comprising:
   a core including silicon (Si) or $SiO_x(0<x<2)$, and
   a shell on the core, the shell including silicon (Si) or $SiO_x(0<x<2)$ and
   having a plurality of nonlinear pores,
   wherein the nonlinear pores are formed as open pores in a surface of the shell,
   wherein an average particle diameter (D50) of the porous silicon-based particles is in a range of 5 μm to 10 μm,
   wherein at least two or more of the nonlinear pores are connected to each other.

2. The porous silicon-based particle of claim 1, wherein an average diameter of the nonlinear pores gradually decreases in a direction of a center of the particle.

3. The porous silicon-based particle of claim 1, wherein an average diameter of the open pores at the surface is in a range of about 30 nm to about 500 nm.

4. The porous silicon-based particle of claim 1, wherein a rate of change in volume of mercury intruded into the pore, which is measured by mercury porosimetry of the porous silicon-based particles, has a peak in an average pore diameter range of 30 nm to 2,500 nm.

5. The porous silicon-based particle of claim 4, wherein the rate of change in volume of mercury has a peak in an average pore diameter range of 50 nm to 600 nm.

6. The porous silicon-based particle of claim 4, wherein a total mercury intrusion volume at the peak is in a range of 0.5 mL/g to 1.2 mL/g.

7. The porous silicon-based particle of claim 1, wherein a specific surface area (Brunauer-Emmett-Teller (BET)-SSA) of the porous silicon-based particles is in a range of 5 m2/g to 50 m2/g.

8. The porous silicon-based particle of claim 1, wherein a depth of the nonlinear pore is in a range of 0.1 μm to 5 μm.

9. The porous silicon-based particle of claim 1, wherein a ratio of a length of the core part to a length of the shell part is in a range of 1:9 to 9:1.

10. The porous silicon-based particle of claim 1, further comprising a carbon coating layer on the porous silicon-based particle.

11. The porous silicon-based particle of claim 1, wherein a porosity of the porous silicon-based particle is in a range of 5% to 90% based on a total volume of the porous silicon-based particle.

12. The porous silicon-based particle of claim 1, wherein a porosity of the porous silicon-based particle is in a range of 10% to 70% based on a total volume of the porous silicon-based particle.

13. An anode active material comprising the porous silicon-based particles of claim 1.

14. The anode active material of claim 13, further comprising a carbon-based material.

15. The anode active material of claim 14, wherein the carbon-based material comprises at least one selected from the group consisting of natural graphite, artificial graphite, meso-carbon microbeads (MCMB), carbon fibers, and carbon black.

16. The anode active material of claim 14, wherein the carbon-based material is included in an amount of 0 parts by weight to 90 parts by weight based on 100 parts by weight of the porous silicon-based particles.

17. An anode comprising the anode active material of claim 13.

18. A lithium secondary battery comprising the anode of claim 17.

19. A porous silicon-based particle, comprising;
a core including silicon (Si) or $SiO_x(0<x<2)$, and
a shell on the core, wherein the shell includes
a plurality of nonlinear pores, and
the nonlinear pores are formed as open pores in a surface of the shell,
wherein an average particle diameter (D50) of the porous silicon-based particles is in a range of 5 μm to 10 μm,
wherein at least two or more of the nonlinear pores are connected to each other, and
wherein the particle is made by a method comprising:
(i) removing an oxide layer pewit on surfaces of an silicon (Si) particle using an etching solution; and
(ii) forming the nonlinear pores in the Si particle by etching the Si particle by mixing and stirring the etching solution including the Si particles with a metal catalyst,
wherein the etching solution having an etchant selected from the group consisting of hydrogen fluoride (HF), hydrofluosilicic acid ($H_2SiF_6$), and ammonium fluoride ($NH_4F$), and
wherein the metal catalyst includes a metal selected from the group consisting of copper (Cu), platinum (Pt), and nickel (Ni), and two or more elements thereof.

20. The porous silicon-based particle of claim 19, wherein the removing of the oxide layer is performed in a temperature range of 20° C. to 90° C. for 30 minutes to 3 hours.

21. The porous silicon-based particle of claim 19, wherein a concentration of the etching solution is in a range of 5 M to 20 M.

22. The porous silicon-based particle of claim 19, wherein a concentration of the metal catalyst is in a range of 5 mM to 100 mM.

23. The porous silicon-based particle of claim 22, wherein a deposition of the metal catalyst is performed for 1 hour to 12 hours.

24. The porous silicon-based particle of claim 19, the method further comprising adding a weak oxidant in step (ii).

25. The porous silicon-based particle of claim 24, wherein the weak oxidant comprises any one selected from the group consisting of phosphite, sulfite, and phosphate, or a mixture of two or more thereof.

26. The porous silicon-based particle of claim 24, wherein a concentration of the weak oxidant is in a range of 0.25 M to 1.0 M.

27. The porous silicon-based particle of claim 19, wherein the etching is performed for 6 hours to 24 hours.

28. The porous silicon-based particle of claim 19, further comprising coating outer surfaces of the porous silicon-based particles with carbon by mixing the porous silicon-based particles with a carbon precursor and performing a heat treatment, after the etching.

29. The porous silicon-based particle of claim 28, wherein the carbon precursor comprises pitch or a hydrocarbon-based material.

30. The porous silicon-based particle of claim 28, wherein the carbon precursor is used in an amount of 10 wt % to 40 wt % based on a total weight of the porous silicon-based particles.

31. The porous silicon-based particle of claim 28, wherein the heat treatment is performed in a temperature range of 300° C. to 1,400° C.

\* \* \* \* \*